US009461782B2

United States Patent
Christoffersson et al.

(10) Patent No.: US 9,461,782 B2
(45) Date of Patent: Oct. 4, 2016

(54) HANDLING REDUNDANT DATA IN A COMMUNICATION SYSTEM

(71) Applicant: Telefonaktiebolaget L M Ericsson (publ), Stockholm (SE)

(72) Inventors: Jan Christoffersson, Luleå (SE); Min Wang, Luleå (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 347 days.

(21) Appl. No.: 14/355,110

(22) PCT Filed: Nov. 1, 2012

(86) PCT No.: PCT/SE2012/051196
§ 371 (c)(1),
(2) Date: Apr. 29, 2014

(87) PCT Pub. No.: WO2013/066258
PCT Pub. Date: May 10, 2013

(65) Prior Publication Data
US 2014/0313981 A1  Oct. 23, 2014

Related U.S. Application Data

(60) Provisional application No. 61/556,040, filed on Nov. 4, 2011.

(51) Int. Cl.
*H04L 1/18* (2006.01)
*H04W 28/06* (2009.01)

(52) U.S. Cl.
CPC ............. *H04L 1/188* (2013.01); *H04L 1/189* (2013.01); *H04L 1/1812* (2013.01); *H04L 1/1822* (2013.01); *H04L 1/1848* (2013.01); *H04W 28/06* (2013.01); *H04L 1/1874* (2013.01)

(58) Field of Classification Search
CPC ... H04W 88/08; H04W 88/12; H04W 28/06; H04L 2001/0092; H04L 1/1812; H04L 1/188; H04L 1/1822; H04L 1/189; H04L 5/0055; H04B 7/024
See application file for complete search history.

(56) References Cited

U.S. PATENT DOCUMENTS

2002/0041567 A1* 4/2002 Yi ..................... H04L 1/1877
370/236
2007/0171830 A1  7/2007 Vulkan et al.
(Continued)

FOREIGN PATENT DOCUMENTS

CN  101123573 A  2/2008
EP  2077639 A2  7/2009
(Continued)

OTHER PUBLICATIONS

3GPP, "3rd Generation Partnership Project; Technical Specification Group Radio Access Network; High Speed Packet Access (HSDPA) multipoint transmission (Release 11)", 3GPP TR 25.872 V11.0.0, Sep. 2011, 1-29.
(Continued)

*Primary Examiner* — Robert M Morlan
(74) *Attorney, Agent, or Firm* — Patents on Demand, P.A.; Brian K. Buchheit; Scott M. Garrett (57) ABSTRACT

In multi flow high speed downlink packed access, MF HSDPA, communication between a radio network controller, RNC, (105) and two Node Bs (104), redundant RLC PDUs are handled by being discarded in the Node B. The discarding can be controlled via a timer in the Node B or by way of additional signalling between the RNC and the Node B.

24 Claims, 9 Drawing Sheets

(56) References Cited

U.S. PATENT DOCUMENTS

2008/0130619 A1* 6/2008 Cha ................. H04L 1/1685
370/346
2009/0103478 A1* 4/2009 Sammour ............. H04L 1/1874
370/328

FOREIGN PATENT DOCUMENTS

| WO | 03058852 A1 | 7/2003 |
|---|---|---|
| WO | 2010016150 A1 | 2/2010 |
| WO | 2013066252 A1 | 5/2013 |
| WO | 2013066258 A2 | 5/2013 |
| WO | 2013070162 A1 | 5/2013 |
| WO | 2013070587 A1 | 5/2013 |

OTHER PUBLICATIONS

Unknown, Author, "HSDPA Multiflow data split options", Nokia Siemens Networks et al., 3GPP TSG-RAN WG2 Meeting #74, R2-113166, Barcelona, Spain, May 9-13, 2011, 1-5.

3GPP. "3rd Generation Partnership Project; Technical Specification Group Radio Access Network; UTRAN Iub interface user plane protocols for Common Transport Channel data streams (Release 10)." 3GPP TS 25.435 V10.2.0. Jun. 2011. 1-61.

Unknown, Author, "HS-DPCCH design considerations for HSDPA MF-TX", InterDigital Communications, LLC. 3GPP TSG-RAN WGI Meeting #67. RI-114174. 6.6.1 Uplink control channel structure and timing, HSDPA Multiflow Data Transmission. USA, San Francisco Nov. 14-18, 2011.1-6.

* cited by examiner

HANDLING REDUNDANT DATA IN A COMMUNICATION SYSTEM

TECHNICAL FIELD

The present disclosure relates to handling redundant data communicated between different entities in a radio access network, such as radio base stations and radio network controllers.

BACKGROUND

The third generation partnership project, 3GPP, is currently working on specifying how HSDPA (High-Speed Downlink Packet Access) systems are to continuously develop in order to enable higher performance. The development includes several features for both UL (Uplink) and DL (Downlink) to enhance the system performance and the capacity as well as enabling a better user experience. Examples of developments are downlink MIMO (Multiple Input Multiple Output) (Release 7 of the 3GPP specifications) and dual cell/dual band HSDPA (Release 8 & 9). Currently in 3GPP radio access network working group RAN 2, a work item is ongoing to specify HSDPA Multiflow Data Transmission (MF-HSDPA) for Release 11 of the 3GPP specifications.

Figure 7:
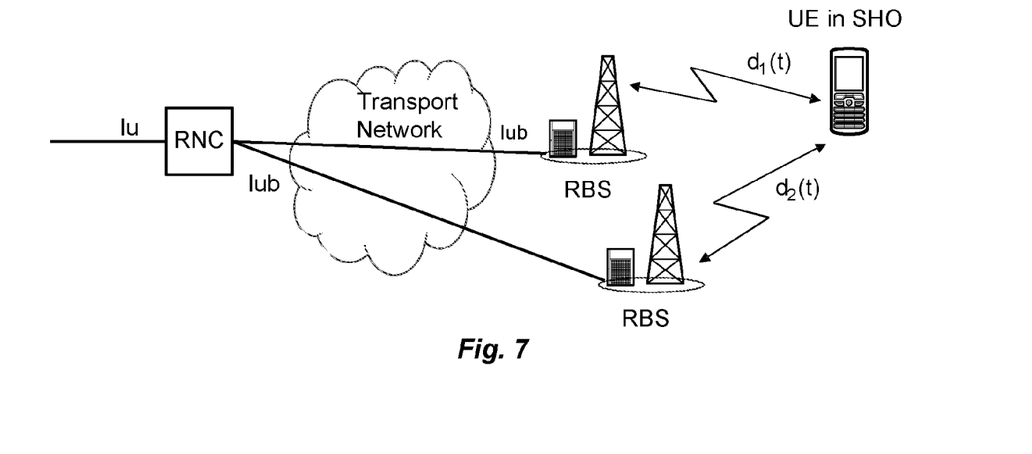
FIGS. 7, 8, 9 and 10 illustrate schematically communicating entities in a mobile communication system.

Hence, the concept of MF-HSDPA is to allow UEs (User Equipment nodes, also referred to as mobile/wireless terminals) to receive HSDPA data from two separate cells. The cells can belong to the same Node B, i.e. radio base station, (intra-site MF-HSDPA) or to different Node Bs (inter-site MF-HSDPA). In the former case, the solution is similar to DC-HSDPA (Dual Cell/Carrier HSDPA), but on the same frequency, with a data split in the MAC-ehs (Medium Access Control enhanced high speed) layer. In the inter-site case, the split may be in either the PDCP (Packet Data Convergence Protocol) or RLC (Radio Link Control) layer. Presently, the discussions are still ongoing of where to do the split. In FIG. 7, an illustration of inter-site MF-HSDPA is seen. The data is split in the RNC (Radio Network Controller), transmitted along the two links to the UE.

A potential benefit of introducing MF-HSDPA is that cell edge users may often suffer from bad coverage and/or low throughput which may bring down the overall system capacity. If these users could use available resources from neighbouring cells, i.e. receive data also from the non-serving cell, their situation could be significantly improved. This would improve the overall system capacity and the user performance for cell edge users.

As mentioned above, there are two alternatives of where to split the data between the links for inter-site MF-HSDPA, i.e., either split the data at the PDCP layer or at the RLC layer.

Communication links between a RNC and Node Bs are realized by way of the so-called Iub interface. Data is communicated between the RNC and Node Bs using data frames carrying RLC PDU(s) (Protocol Data Unit(s)) encapsulated in Medium Access Control dedicated, MAC-d, PDU(s).

Figure 8:
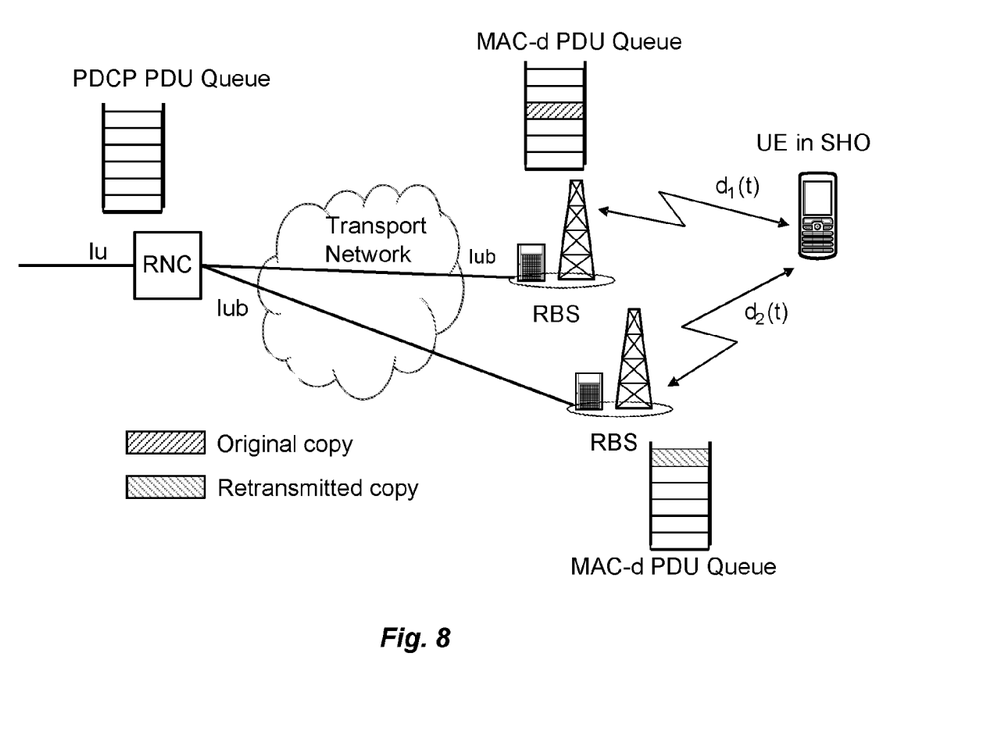

When RLC transmissions get stuck on one link, it may be a good alternative to retransmit the RLC PDU(s) (Protocol Data Unit(s)) over the other link, as illustrated in FIG. 8. If the retransmission cannot get through over the other link either, further retransmissions could be switched back to the original link. However, in this case there could be old copies of RLC PDUs existing at the link(s) besides the last retransmitted copy. This may cause certain problems. First, the redundant copies waste resources. The second issue relates to a case when the RLC PDU sequence number (SN) wraps around. The RLC receiver window may move forward when the retransmitted PDU is received at the UE. Since the other copies could take quite a while before arriving at the UE, the RLC SN could wrap around. When this happens and the delayed copy is eventually received by the UE, it may be treated as an original transmission. This may result in: (1) a lot of unnecessary retransmission due to the misjudged "missing SN"; and/or (2) the UE assembling the "old" retransmitted RLC PDUs with this misjudged new data causing "corrupted RLC SDUs" to be delivered to higher layers.

SUMMARY

In order to mitigate at least some of the drawbacks as discussed above, there are provided methods, apparatuses and computer program products in several aspects.

In a first aspect of the invention there is provided a method in a radio base station. The radio base station is configured to participate in inter-site HSDPA MF operation wherein data is communicated to a first user equipment via the radio base station and at least one other radio base station. Data is communicated from a radio network controller to the radio base station and the at least one other radio base station in MAC-d PDUs. The method comprises receiving a MAC-d PDU. A timer is associated with the MAC-d PDU and the timer is set to expire after a predetermined time period. The received MAC-d PDU are discarded if no HARQ process has been assigned for transfer of the MAC-d PDU to the first user equipment upon expiry of the timer.

In a second aspect of the invention, there is provided a method in a radio base station. The radio base station is configured to participate in inter-site HSDPA MF operation wherein data is communicated to a first user equipment via the radio base station and at least one other radio base station. Data is communicated from a radio network controller to the radio base station and the at least one other radio base station for forwarding to the first user equipment in RLC PDUs encapsulated in MAC-d PDUs. The method comprises receiving MAC-d PDUs and buffering the received MAC-d PDUs in a queue pending transfer to the first user equipment. A discard indication signal is received from the radio network controller instructing the radio base station to discard one or more RLC PDUs. The MAC-d PDUs currently in the queue pending transfer to the first user equipment are searched through and any MAC-d PDUs found in the queue containing a RLC PDU comprised in said one or more RLC PDUs are discarded.

In a third aspect of the invention, there is provided a method in a radio network controller. The radio network controller is configured for inter-site HSDPA MF operation wherein data is communicated to a first user equipment via at least two radio base stations. Data is communicated from the radio network controller to the at least two radio base stations for forwarding to the first user equipment in RLC PDUs encapsulated in MAC-d PDUs. The method comprises detecting a need to discard one or more identified RLC PDUs in a first radio base station among said at least two radio base stations. A discard indication signal is then transmitted to the first radio base station instructing the first radio base station to discard said one or more identified RLC PDUs.

In a fourth aspect of the invention, there is provided a radio base station. The radio base station is configurable for participating in inter-site HSDPA MF operation wherein data is communicated to a first user equipment via the radio base station and at least one other radio base station. Data is communicated from a radio network controller to the radio base station and the at least one other radio base station in MAC-d PDUs. The radio base station comprises a receiver arranged to receive a MAC-d PDU and digital data processing circuitry. The digital data processing circuitry is operable connected to the receiver and arranged to associate a timer with the MAC-d PDU and setting the timer to expire after a predetermined time period. The digital data processing circuitry is further arranged to discard the received MAC-d PDU if no HARQ process has been assigned for transfer of the MAC-d PDU to the first user equipment upon expiry of the timer.

In a fifth aspect of the invention, there is provided a radio base station. The radio base station is configurable for participating in inter-site HSDPA MF operation wherein data is communicated to a first user equipment via the radio base station and at least one other radio base station. Data is communicated from a radio network controller to the radio base station and the at least one other radio base station for forwarding to the first user equipment in RLC PDUs encapsulated in MAC-d PDUs. The radio base station comprises a receiver and digital data processing circuitry operable connected to the receiver. The receiver is arranged to receive MAC-d PDUs and further to receive a discard indication signal from the radio network controller instructing the radio base station to discard one or more RLC PDUs. The digital data processing circuitry is arranged to buffer the received MAC-d PDUs in a queue pending transfer to the first user equipment and further arranged to, upon the receiver receiving the discard indication signal, search through the MAC-d PDUs currently in the queue pending transfer to the first user equipment and to discard any MAC-d PDUs found in the queue containing a RLC PDU comprised in said one or more RLC PDUs.

In a sixth aspect of the invention, there is provided a radio network controller. The radio network controller is configurable for inter-site HSDPA MF operation wherein data is communicated to a first user equipment via at least two radio base stations and wherein data is communicated from the radio network controller to the at least two radio base stations for forwarding to the first user equipment in RLC PDUs encapsulated in MAC-d PDUs. The radio network controller comprises digital data processing circuitry arranged to detect a need to discard one or more identified RLC PDUs in a first radio base station among said at least two radio base stations. The digital data processing circuitry is further arranged to generate a discard indication signal for transmission to the first radio base station. The radio network controller also comprises a transmitter, operable connected to the digital data processing circuitry and arranged to transmit the generated discard indication signal to the first radio base station.

In a seventh aspect of the invention, there is provided a non-transitory computer program product comprising software instructions that are configured, when executed in a processing device, to perform the method of any of the first, second and third aspect.

An advantage of embodiments of the invention is that, when operating in a MF-HSDPA scenario, the risk for unnecessary retransmissions of RLC PDUs over the air interface can be reduced. Also, by discarding redundant RLC PDUs, the risk for user equipments assembling corrupted RLC PDUs that are delivered to higher layers in the user equipments can be reduced.

DETAILED DESCRIPTION

Figure 1:
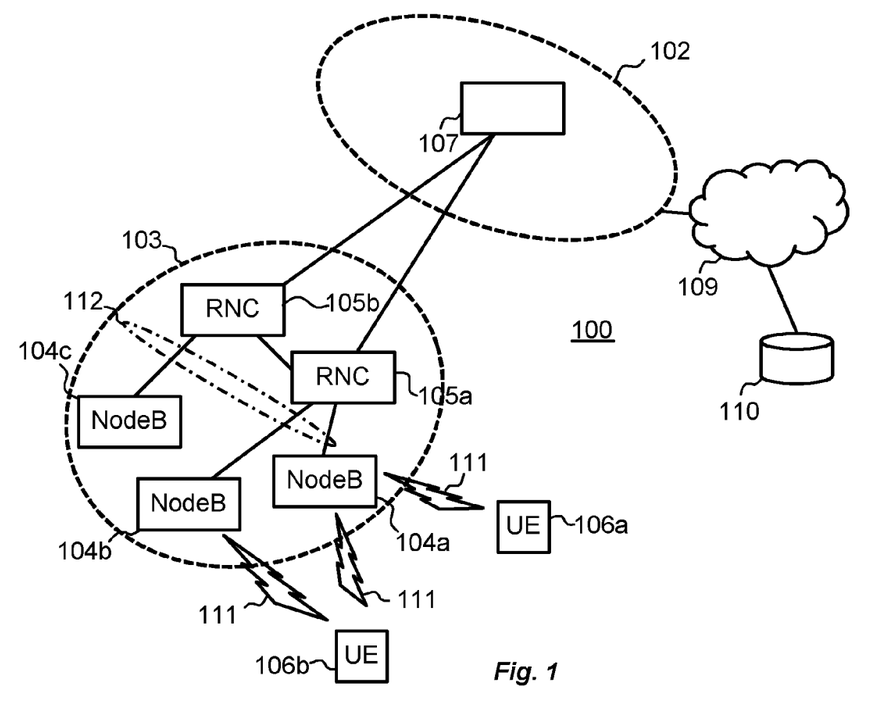
FIG. 1 illustrates schematically a mobile communication system.

FIG. 1 illustrates schematically a mobile communication system in the form of a cellular network 100 in which the present methods and apparatuses can be implemented. The cellular network 100 in FIG. 1 is exemplified by a universal mobile telecommunications system, UMTS. It should be noted, however, that the skilled person will readily be able to perform implementations in other similar communication systems involving transmission of coded data between nodes.

In FIG. 1 the cellular network 100 comprises a core network 102 and a UMTS terrestrial radio access network, UTRAN, 103. The UTRAN 103 comprises a number of nodes in the form of radio network controllers, RNC, 105a, 105b, each of which is coupled via a so-called transport network, TN, 112, to a set of neighbouring nodes in the form of a first, a second and a third NodeB 104a, 104b, 104c. The NodeBs are also referred to as radio base stations. Each NodeB 104 is responsible for a given geographical radio cell and the controlling RNC 105 is responsible for routing user and signalling data between that NodeB 104 and the core network 102. All of the RNCs 105 are coupled to one another. Signaling between the Node Bs and the RNCs includes signalling according to the Iub interface. A general outline of the UTRAN 103 is given in 3GPP technical specification TS 25.401 V10.2.0.

FIG. 1 also illustrates communicating entities in the form of mobile devices or user equipment, UE. A first UE 106a communicates with the first NodeB 104a via an air interface 111 and a second UE 106b communicates with the first NodeB 104a and with the second NodeB 104b via the air interface 111. As will be elucidated in some detail below, the second UE 106b operates by utilizing MF-HSDPA in relation to the two NodeB's 104a and 104b.

The core network 102 comprises a number of nodes represented by node 107 and provides communication services to the UEs 106 via the UTRAN 103, for example for communication between UEs connected to the UTRAN 103 or other mobile or fixed networks and when communicating with the Internet 109 where, schematically, a server 110 illustrates an entity with which the mobile devices 106 may communicate. As the skilled person realizes, the network 100 in FIG. 1 may comprise a large number of similar functional units in the core network 102 and the UTRAN 103, and in typical realizations of networks, the number of mobile devices may be very large.

Figure 2:
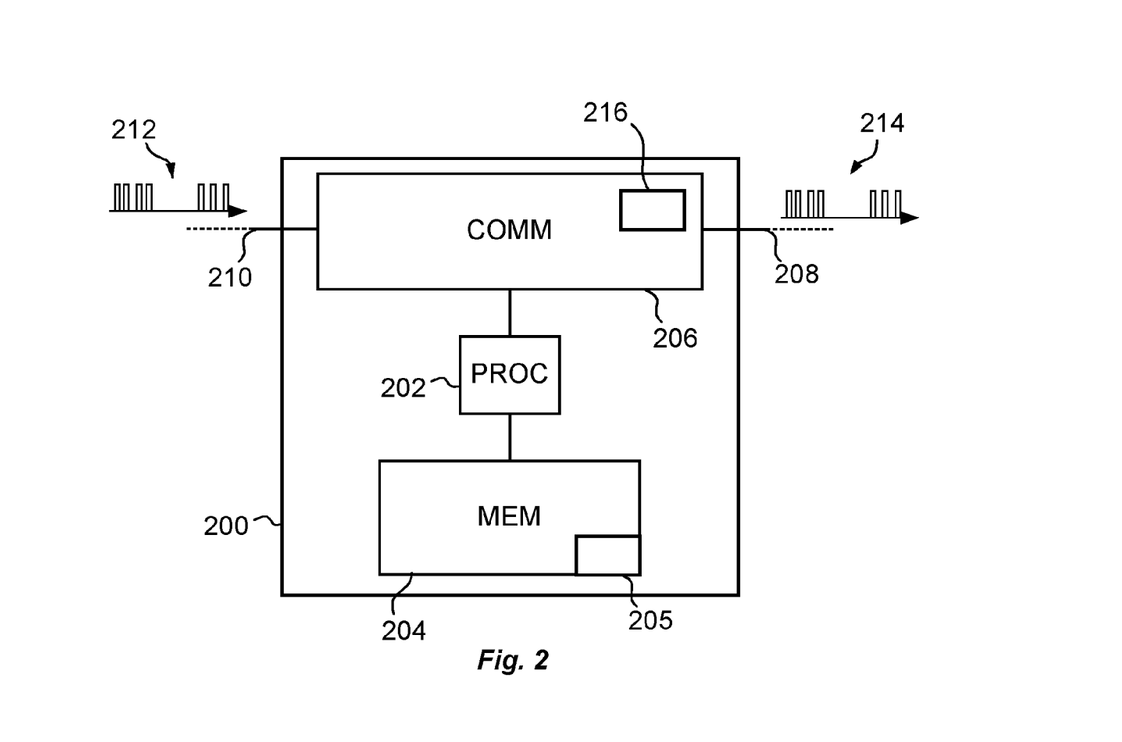
FIG. 2 illustrates schematically a radio network controller.

FIG. 2 is a functional block diagram that schematically illustrates an example of a radio network controller, RNC, 200 that is configured to operate in a radio access network, such as the UTRAN 103 in FIG. 1. In the embodiment of FIG. 2, the RNC 200 represents a RNC, such as any of the RNC's 105 in FIG. 1.

The RNC 200 comprises digital data processing circuitry comprising processing means, memory means and communication means in the form of a processor 202, a memory 204 and communication circuitry 206 that includes a transmitter 216 capable of transmitting data to other entities in the network. For example, the circuitry of these means 202, 204 and 206 can comprise and/or form part of one or more application specific integrated circuit, ASIC, as well as one or more digital signal processor, DSP. The RNC 200 receives data 212 via an incoming data path 210 and transmits data 214 via an outgoing data path 208. The data 210, 212 can be any of uplink and downlink data, as the skilled person will realize.

The methods to be described below can be implemented in the RNC 200. In such embodiments, the method actions are realized by means of software instructions 205 that are stored in the memory 204 and are executable by the processor 202. Such software instructions 205 can be realized and provided to the RNC 200 in any suitable way, e.g. provided via the networks 102, 103 or being installed during manufacturing, as the skilled person will realize. Moreover, the memory 204, the processor 202, as well as the communication circuitry 206 comprise software and/or firmware that, in addition to being configured such that it is capable of implementing the methods to be described, is configured to control the general operation of the RNC 200 when operating in a communication system such as the system 100 in FIG. 1. However, for the purpose of avoiding unnecessary detail, no further description will be made in the present disclosure regarding this general operation.

Figure 3:
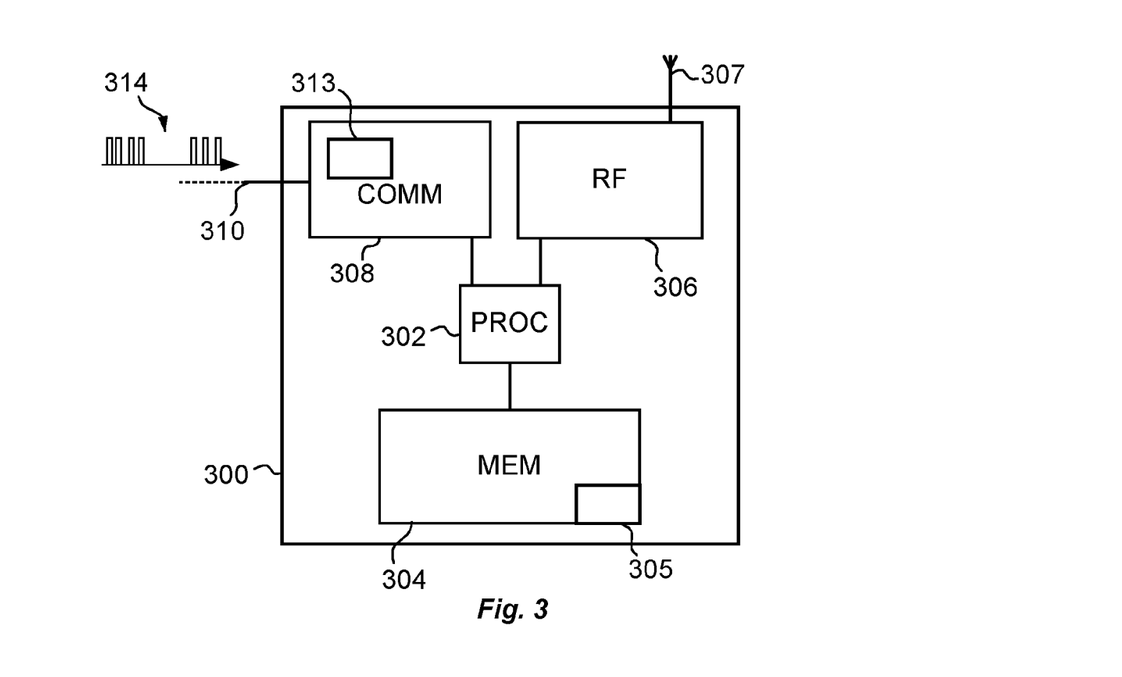
FIG. 3 illustrates schematically a radio base station.

FIG. 3 is a functional block diagram that schematically illustrates an example of a radio base station, RBS, in the form of a Node B 300, corresponding to any of the Node Bs 106 in FIG. 1. The Node B 300 comprises radio frequency, RF, receiving and transmitting circuitry 306, an antenna 307, communication circuitry 308 and digital processing circuitry comprising a processor 302 and a memory 304. The communication circuitry 308 includes a receiver 313 capable of receiving data from other entities in the network. Radio communication via the antenna 307 is realized by the RF circuitry 306 controlled by the processor 302, as the skilled person will understand. The circuitry of means 302, 304, and 308 can comprise and/or form part of one or more application specific integrated circuit, ASIC, as well as one or more digital signal processor, DSP. The processor 302 makes use of software instructions 305 stored in the memory 304 in order to control functions of the Node B 300, including the functions to be described in detail below with regard to handling of PDUs. Further details regarding how these units operate in order to perform normal functions within a communication system, such as the system 100 of FIG. 1, are outside the scope of the present disclosure and are therefore not discussed further.

Figure 4:
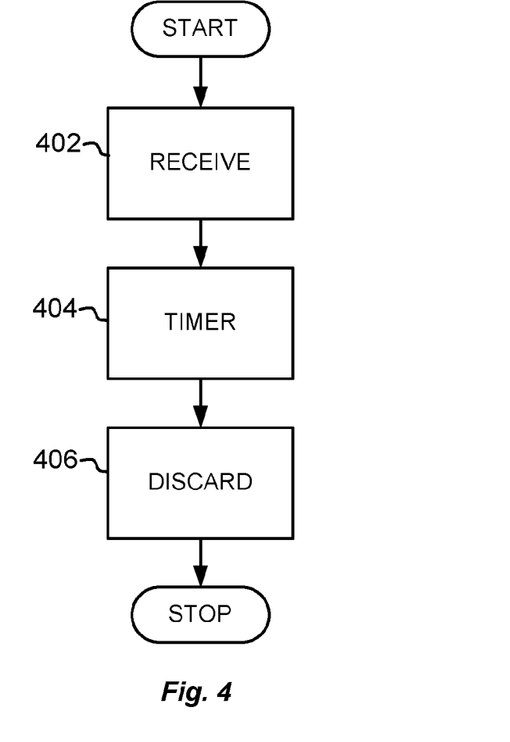
FIGS. 4, 5 and 6 are flow charts of methods embodying the invention.
Figure 5:
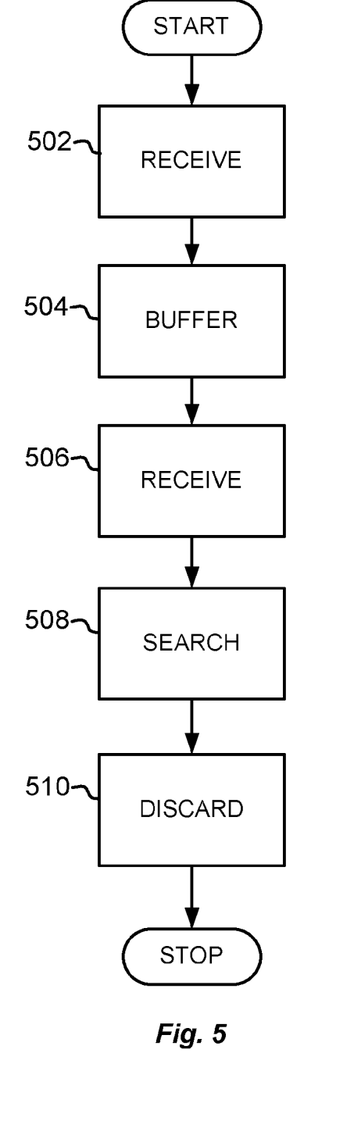
Figure 6:
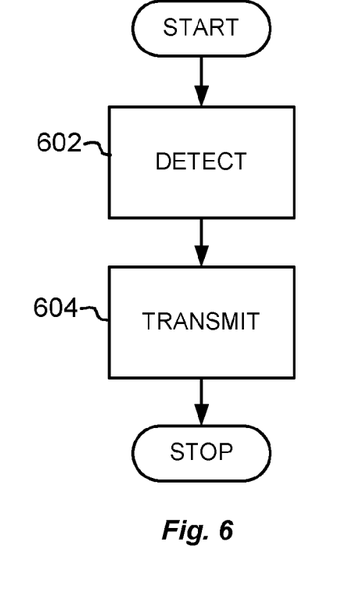

Turning now to FIGS. 4, 5 and 6, and with continued reference to the previous figures, examples of methods for handling PDUs will be described in some more detail. FIG. 4 describes a first method in a radio base station, RBS, or Node B, such as a Node B as illustrated by the Node Bs 104 in FIG. 1 and the node B 300 in FIG. 3. FIG. 5 describes a second method in a RBS or Node B, such as a Node B as illustrated by the Node Bs 104 in FIG. 1 and the node B 300 in FIG. 3. FIG. 6 describes a method in a RNC, such as any of the RNCs 105 in FIG. 1 and the RNC 200 in FIG. 2. The methods of FIGS. 5 and 6 describe behaviour in separate interrelated products that facilitate a discard of redundant data.

The first method in a RBS or Node B is illustrated in FIG. 4. The radio base station is configured to participate in inter-site HSDPA MF operation wherein data is communicated to a first user equipment via the radio base station and at least one other radio base station. Data is communicated from a radio network controller to the radio base station and the at least one other radio base station in MAC-d PDUs.

The first method in a RBS commences with a reception step 402 in which a MAC-d PDU is received. A timer is associated, in a timer step 404, with the MAC-d PDU. The timer is set to expire after a predetermined time period. The received MAC-d PDU is discarded, in a discard step 406, if no HARQ process has been assigned for transfer of the MAC-d PDU to the first user equipment upon expiry of the timer.

The timer setting can be set and adaptively updated according to several factors. For example, the cell load, the downlink, DL, radio link quality (CQI or Channel Quality Indicator), the uplink, UL, radio link quality (noise rise), or even the service QoS (Quality of Service) requirements. Other factors related to RLC can also be considered. Further, the timer can be set/updated also based on the MAC-d PDU sizes, for example, a long timer can be defined for relatively large PDU sizes, and a short timer can be defined for relatively small PDU sizes. The timer setting can be mandated by the RNC, in which case the setting can be included in NBAP signalling or carried in band with the Iub frames. It is also possible that the Node B chooses the timer setting, in which case no extra signalling is needed.

When a MAC-d PDU is received by the Node B, it is put into, i.e. buffered in, it's associated priority queue (PQ). Then, the timer will be started. If a HARQ (Hybrid Automatic Repeat reQuest) process is assigned to transfer the MAC-d PDU before the timer expires, the timer will be stopped. If before this timer expires there is no data transfer initiated at the HARQ process, the related MAC-d PDU will be cleared (or discarded). All MAC-d PDUs received by the Node B in the same HS-DSCH (High-Speed Downlink Shared Channel) data frame should be buffered in the same PQ. It is also possible to have a common (single) timer associated with all MAC-d PDUs received in the same HS-DSCH data frame.

Figure 9:
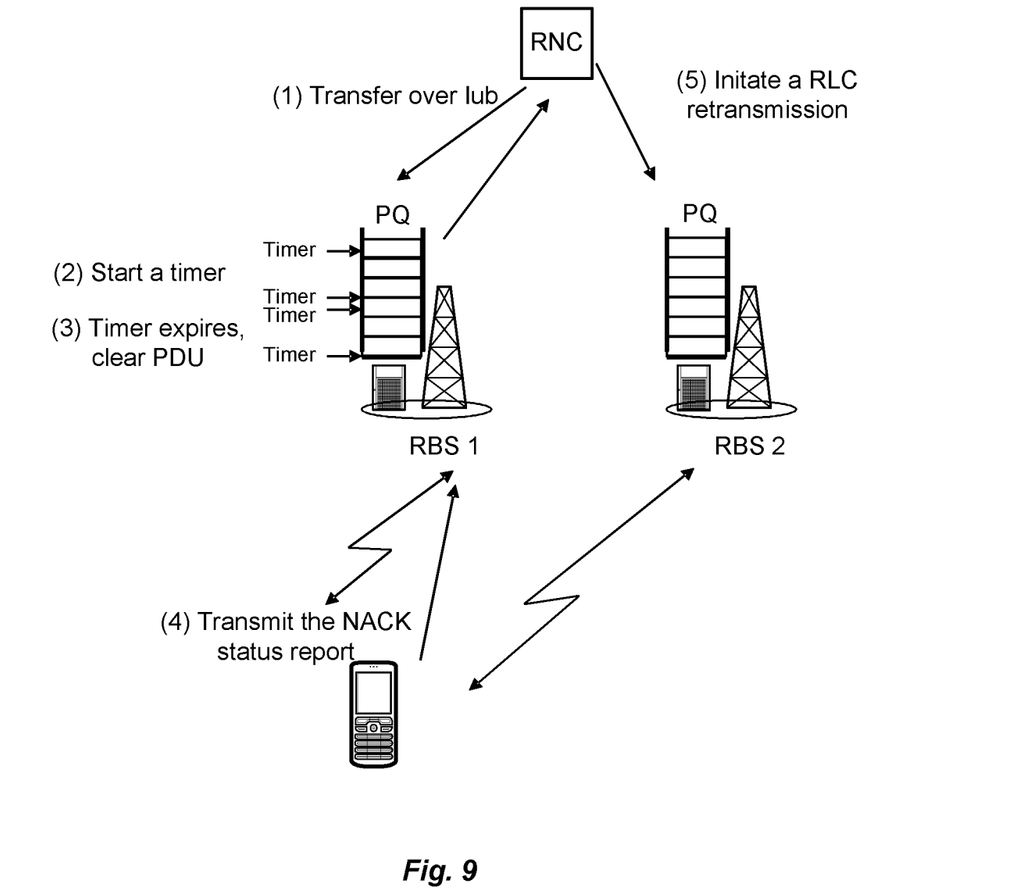

As shown in FIG. 9, an example of the timer based procedure is illustrated by steps (1) to (5). In a first step (1), MAC-d PDUs (encapsulating/carrying RLC PDUs) are transmitted from the RNC to the Node Bs, RBS1, RBS2. Note that FIG. 9 only shows transmissions to RBS 1 although in most cases MAC-d PDUs would be transmitted to both RBS1 and RBS2. When the MAC-d PDUs are received in the RBS they are put in the priority queue and a timer is started, step (2), individually for each MAC-d PDU. If the timer expires for any MAC-d PDU this PDU will be cleared from the priority queue in step (3). When the UE discovers that a RLC PDU is not received, it will transmit a NACK status report to the RNC in step (4). Upon reception of the NACK status report, the RNC will initiate a RLC retransmission of the RLC PDU in step (5). The retransmission involves transmitting a MAC-d PDU encapsulating/carrying the RLC PDU. In FIG. 9, the retransmission in step (5) is done via RBS 2, but in reality any of RBS1 or RBS 2 could be used. The timer with an appropriate setting will make the MAC-d PDU copies at the original link, i.e. in RBS1 in the example in FIG. 9, will be cleared when the RLC retransmission is started.

The second method in a RBS or Node B is illustrated in FIG. 5. The radio base station is configured to participate in inter-site HSDPA MF operation wherein data is communicated to a first user equipment via the radio base station and at least one other radio base station. Data is communicated from a radio network controller to the radio base station and the at least one other radio base station for forwarding to the first user equipment in RLC PDUs encapsulated in MAC-d PDUs.

The second method in a RBS commences with a reception step 502 in which MAC-d PDUs are received. The received MAC-d PDUs are buffered, in a buffering step 504, in a queue pending transfer to the first user equipment. A discard indication signal is received, in a reception step 506, from the radio network controller instructing the radio base station to discard one or more RLC PDUs. The MAC-d PDUs currently in the queue are searched through, in a search step 508, pending transfer to the first user equipment. Any MAC-d PDUs found by the search in the queue containing a RLC PDU comprised in said one or more RLC PDUs are discarded in a discard step 510.

The method in a radio network controller that is illustrated in FIG. 6 may be used to control a Node B implementing the method in FIG. 5. Hence, the radio network controller is configured for inter-site HSDPA MF operation wherein data is communicated to a first user equipment via at least two radio base stations and wherein data is communicated from the radio network controller to the at least two radio base stations for forwarding to the first user equipment in RLC PDUs encapsulated in MAC-d PDUs.

The method in the radio network controller commences with a detection step 602 in which a detection is made of a need to discard one or more identified RLC PDUs in a first radio base station among said at least two radio base stations. A discard indication signal is transmitted, in a transmission step 604, to the first radio base station instructing the first radio base station to discard said one or more identified RLC PDUs.

That is, additional signalling can be introduced so that the RNC can order Node B(s) to clear (or discard) specific RLC PD Us. The SNs of the RLC PDUs which could/should be cleared can be carried in Iub frames (either in the data frame or in the control frame, for example in the capacity request frame). There are a few reserved bits available in the Iub frames. The corresponding MAC-d PDUs will be cleared in the Node B immediately upon reception of the clearing message.

Figure 10:
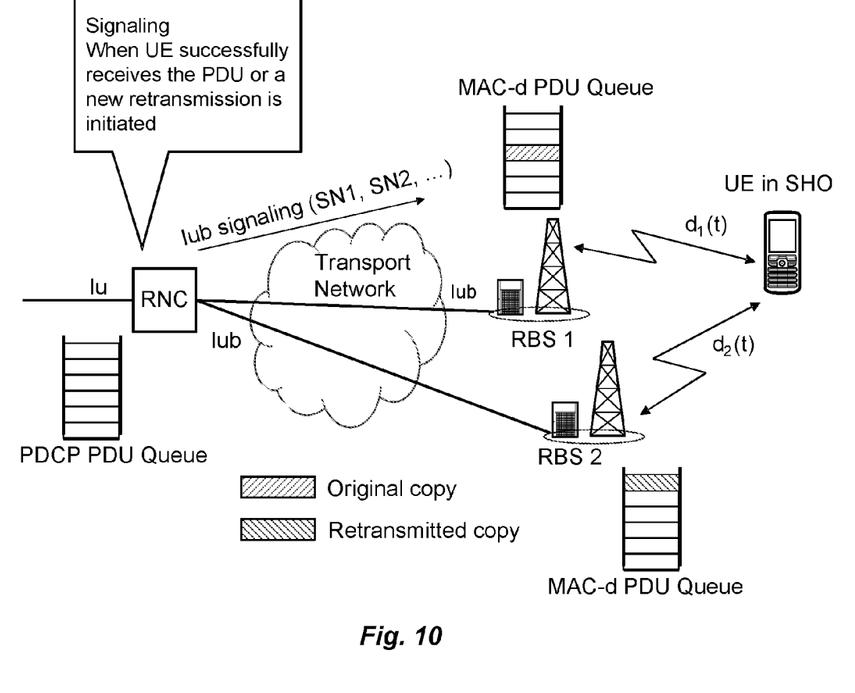

Preferably, the signalling is triggered when the UE has acknowledged to RNC that the related RLC PDUs (either the original transmission or one of the retransmissions) have been successfully received. Another alternative is that whenever the RNC starts a new RLC retransmission upon the reception of the NACK status report, it sends a clearing message to the Node B on the other link. An example of the procedure is shown in FIG. 10. Here an original transmission of a RLC PDUs from the RNC to the UE via a first Node B RBS1 has been done, but this transmission has been stalled in the first Node B RBS1. The UE sends a NACK status report to the RNC which initiates a retransmission of this RLC PDU via a second Node B RBS 2. The retransmission involves transmitting a MAC-d PDU containing the RLC PDU via the second Node B RBS2. Upon retransmission of the RLC PDU, the RNC sends a clearing message for this RLC PDU to the first Node B RBS 1, which still may have a copy of a MAC-d PDU containing the RLC PDU in its priority queue. In this case, the MAC-d PDU containing the RLC PDU will be cleared in the first Node B RBS1 upon reception of the clearing message.

RLC PDU and MAC-d PDU is typically a one to one mapping since there is no segmentation or concatenation supported when RLC PDU is delivered to the MAC-d layer.

When RBS receives the RLC PDU SNs of RLC PDUs which should be cleared, RBS starts to search all MAC-d PDUs in PQ to find the corresponding RLC PDUs. The RBS reads the RLC PDU headers of MAC-d PDUs in the PQ and if a RLC PDU is found which has a SN that matches a specific SN which should be cleared, the RBS will clear the corresponding MAC-d PDU from the PQ. If transmission of that MAC-d PDU has already been started by a HARQ process, the HARQ process can also be cleared.

According to 3GPP TS 25.435 V10.2.0, the Data Transfer procedure is used to transfer a HS-DSCH DATA FRAME conveying MAC-d PDU(s) from the RNC to a Node B. HS-DSCH DATA FRAME TYPE 2 is selected if the IE HS-DSCH MAC-d PDU Size Format in NBAP (TS 25.433) is present and set to 'Flexible MAC-d PDU Size' [FDD and 1.28 Mcps TDD—or if the IE HS-DSCH Common System Information is present and the UE is in Cell_FACH (Cell Forward Access Channel) state. HS-DSCH DATA FRAME TYPE 1 is selected in any other case.

The HS-DSCH DATA FRAME TYPE 3 is only used in CELL_PCH and URA_PCH states. Since current plans are for CELL_DCH state only, use of HS-DSCH DATA FRAME TYPE 3 is currently not a feasible option for MF-HSDPA. However, if in the future MF-HSDPA operation would be possible in CELL_PCH (Cell Paging Channel) and/or URA_PCH (UTRAN Registration Area Paging Channel) states it might be possible to use also HS-DSCH DATA FRAME TYPE 3.

Hence, a new information element (IE) is provided, for example named "Notification of the discarding RLC PDUs", which is carried in either an Iub data frame or in an Iub control frame. The information element can contain the sequence number of one or more RLC PDUs which should be cleared. There can also be other information associated in the data or control frame, for example an indication of the presence of the new information element.

Some examples of embodiments illustrating how to carry RLC PDU SNs in Iub frames are provided below.

As a first example, the RLC PDU SNs may be carried in a Iub data frame Type 1 as illustrated below.

Figures 11, 12:
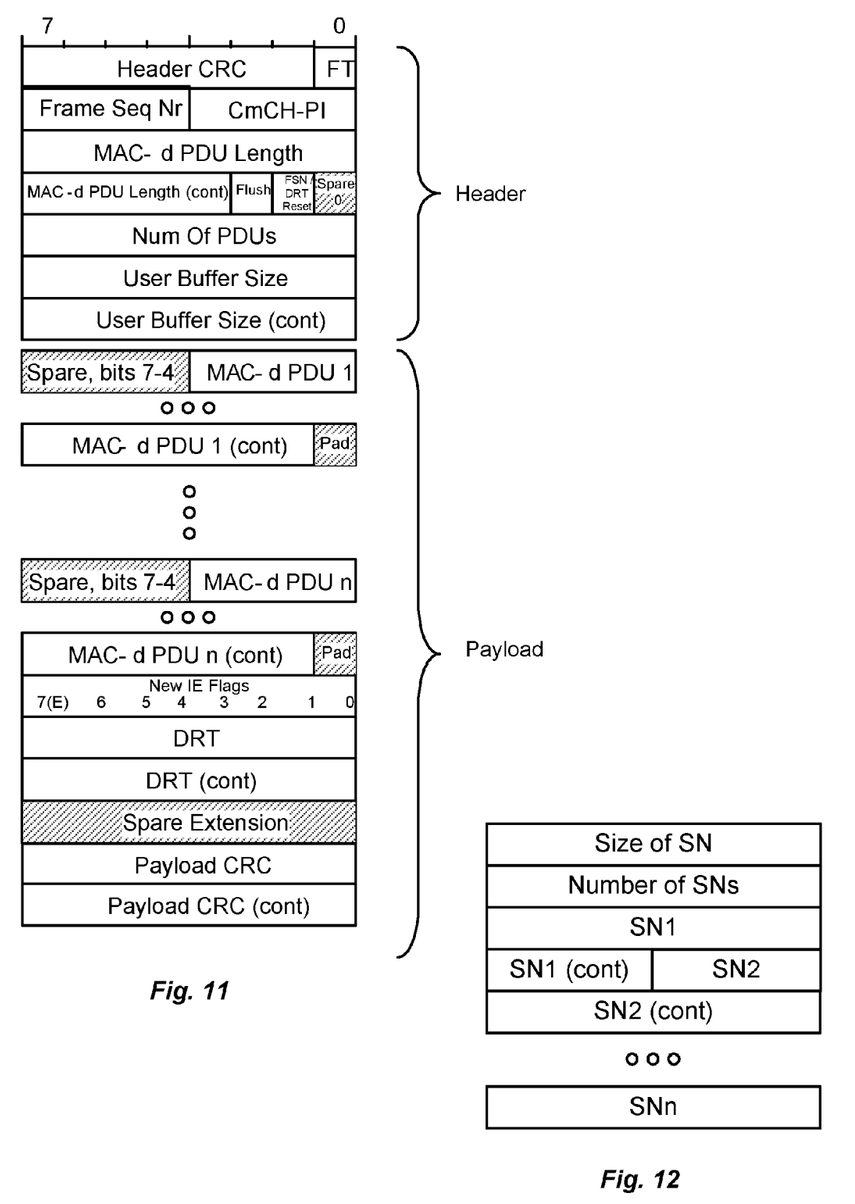
FIGS. 11, 12, 13 and 14 illustrate schematically content of data frames used for communication between entities in a mobile communication system.

In FIG. 11 below, a new information element (IE) called "Notification of RLC PDUs to be discarded" can be included in the data frame after the DRT field if DRT is present. If DRT is not present, this new IE can be included in the data frame after the New IE Flags field. Other possible placements of the new IE can also be used. As an example format for the new IE, the first octet of the IE can indicate the length of the RLC PDU SN. The second octet of the IE can indicate the number of included RLC PDU SNs. The octets following can indicate the actual SNs which are to be cleared. This example format of the new IE is illustrated in FIG. 12.

To further reduce the length of the "Notification of RLC PDUs to be discarded" IE, the difference between the SNs can be calculated and carried instead of the actual SNs. For example, the first SN can be included. Then, the difference between the next SN and the first SN can be calculated as:

$$\text{Diff2} = \text{SN2} - \text{SN1} \tag{1}$$

$$\text{Diff3} = \text{SN3} - \text{SN1} \tag{2}$$

Then, Diff2 and Diff3 will be carried instead of the SN2 and SN3. The format of the IE "Notification of RLC PDUs to be discarded" can be changed accordingly.

As another example, the RLC PDU SNs of RLC PDUs to be discarded can be carried in a Iub data frame Type 2 as follows.

Figure 13:
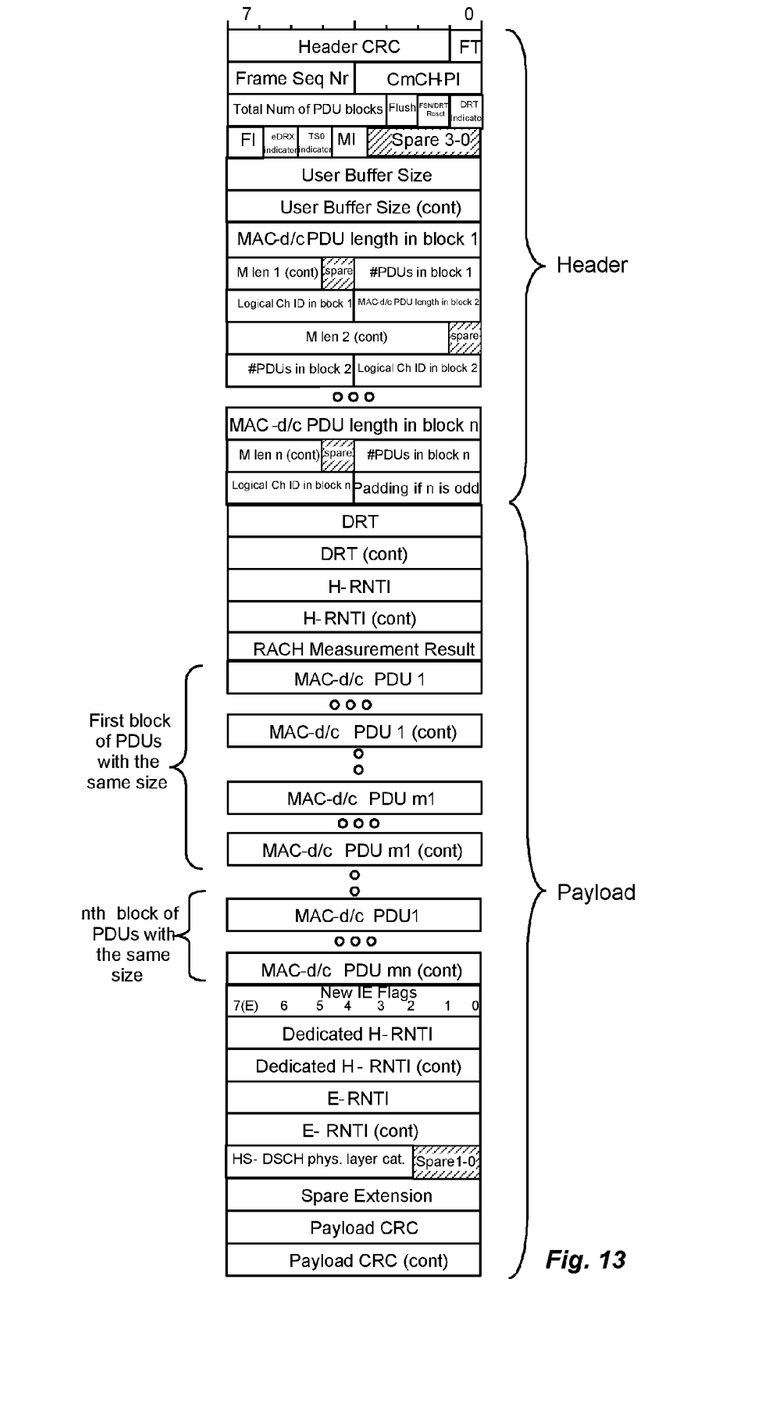

To include the RLC PDU SNs into the data frame Type 2 the new IE named "Notification of RLC PDUs to be discarded" can be added after HS-DSCH physical layer category in FIG. 13 if HS-DSCH physical layer category is present in the data frame. If the filed HS-DSCH physical layer category is not present, the new IE can be added from the octet that HS-DSCH physical layer category was supposed to occupy. The new IE can even be added after the New IE Flags, if the IEs including Dedicated H-RNTI (HS-DSCH Radio Network Temporary Identifier), E-RNTI (E-DCH Radio Network Temporary Identifier), and HS-DSCH physical layer category are not present. There are also other possibilities to place the new IE.

As yet another example, the RLC PDU SNs of RLC PDUs to be discarded can be carried in a Iub control frame CAPACITY (CA) REQUEST as follows.

The HS-DSCH Capacity Request procedure provides means for the RNC to request HS-DSCH capacity by indicating the user buffer size in the RNC for a given priority level.

The RNC is allowed to reissue the HS-DSCH Capacity Request if no CAPACITY (CA) ALLOCATION (TYPE 1 or TYPE 2) has been received within an appropriate time threshold.

Figure 14:
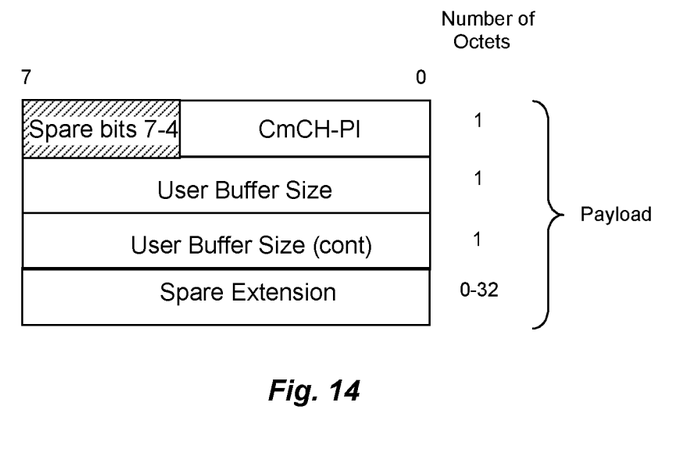

The RLC PDU SNs can be included in the control frame capacity request to inform the RBS to clear the MAC-d PDUs, by defining a new information element "Notification of the discarding RLC PDUs" (as described before) after the User Buffer Size field in FIG. 14

As demonstrated above, some embodiments of the invention can involve setting a timer for each RLC PDU at the radio base station, i.e. Node B. When the timer expires, the associated RLC PDU is cleared at the Node B. The setting of this timer can be a fixed value or it can be a variable value per each RLC PDU so that the timer is adjusted to the instant conditions like, for example, instant radio channel quality, buffer status at the Node B etc. Other embodiments of the invention can involve clearing redundant copies of RLC PDUs by additional signaling between a radio base station and a radio network controller, for example carried in band with the Iub data frame or Iub control frame. By this additional signaling, a radio network controller can order a radio base station to clear or discard specific RLC PDUs.

As used herein, the terms "comprise", "comprising", "comprises", "include", "including", "includes", "have", "has", "having", or variants thereof are open-ended, and include one or more stated features, integers, nodes, steps, components or functions but do not preclude the presence or addition of one or more other features, integers, nodes, steps, components, functions or groups thereof.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BluRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, microcode, etc.) that runs on a processor such as a digital signal processor, which may collectively be referred to as "circuitry," "a module" or variants thereof.

Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

Other network elements, communication devices and/or methods according to embodiments of the invention will be or become apparent to one with skill in the art upon review of the present drawings and description. It is intended that all such additional network elements, devices, and/or methods be included within this description, be within the scope of the claims. Moreover, it is intended that all embodiments disclosed herein can be implemented separately or combined in any way and/or combination.

Although attempt has been made in the above to explain the abbreviations when first introduced below follows a list of most of the abbreviations used:
ARQ Automatic Repeat request
3GPP RAN2 Name of a working group in 3GPP
DC-HSDPA Dual Cell/Carrier High Speed Downlink Packet Access
CQI Channel Quality Indicator
DL Downlink
DRT Delay Reference Time E-DCH Enhanced Dedicated Channel
HARQ Hybrid ARQ
HS-DSCH High-Speed Downlink Shared Channel
HSDPA High-Speed Downlink Packet Access
MF-HSDPA HSDPA Multiflow Data Transmission
MAC Medium Access Control
MAC-d MAC-dedicated
MAC-ehs MAC-enhanced high speed
MIMO Multiple Input Multiple Output
NACK Negative Acknowledgement
PDCP Packet Data Convergence Protocol
PDU Protocol Data Unit
PQ Priority Queue
QoS Quality of Service
RAN Radio Access Network
RBS Radio Base Station (alternatively referred to as Node B)
RLC Radio Link Control
SN Sequence Number
UE User Equipment
UL Uplink
URA UTRAN Registration Area
UTRAN Universal Terrestrial Radio Access Network

The invention claimed is:

1. A method in a radio base station, said radio base station being configured to participate in inter-site High-Speed Downlink Packet Access Multiflow Data Transmission (HSDPA MF) operation wherein data is communicated to a first user equipment via the radio base station and at least one other radio base station and wherein data is communicated from a radio network controller to the radio base station and the at least one other radio base station in Medium Access Control-dedicated (MAC-d) Protocol Data Units (PDUs), the method comprising:
receiving a MAC-d PDU;
associating a timer with the MAC-d PDU and setting the timer to expire after a predetermined time period; and
discarding the received MAC-d PDU if no Hybrid Automatic Repeat request (HARQ) process has been assigned for transfer of the MAC-d PDU to the first user equipment upon expiry of the timer.

2. The method of claim 1, wherein the timer associated with the MAC-d PDU is stopped upon assigning a HARQ process for transfer of the MAC-d PDU to the user equipment.

3. The method of claim 1, wherein the predetermined time period is set according to a parameter received from the radio network controller.

4. The method of claim 1, wherein the predetermined time period is selected by the radio base station.

5. The method of claim 1, wherein the predetermined time period is selected based on one or more of cell load, downlink radio link quality, uplink radio link quality, QoS requirements, or MAC-d PDU size.

6. The method of claim 1, wherein all MAC-d PDUs received in one High-Speed Downlink Shared Channel (HS-DSCH) data frame are associated with a common timer.

7. A method in a radio base station, wherein said radio base station is configured to participate in inter-site High-Speed Downlink Packet Access Multiflow Data Transmission (HSDPA MF) operation wherein data is communicated to a first user equipment via the radio base station and at least one other radio base station and wherein data is communicated from a radio network controller to the radio base station and the at least one other radio base station for forwarding to the first user equipment in Radio Link Control (RLC) Protocol Data Units (PDUs) encapsulated in Medium Access Control-dedicated (MAC-d) PDUs, the method comprising:
receiving MAC-d PDUs;
buffering the received MAC-d PDUs in a queue pending transfer to the first user equipment;
receiving a discard indication signal from the radio network controller instructing the radio base station to discard one or more RLC PDUs;
searching through the MAC-d PDUs currently in the queue pending transfer to the first user equipment; and
discarding any MAC-d PDUs found in the queue containing a RLC PDU comprised in said one or more RLC PDUs.

8. The method of claim 7, wherein said discard indication signal is a High-Speed Downlink Shared Channel (HS-DSCH) DATA FRAME including a discard notification field providing identification of said one or more RLC PDUs.

9. The method of claim 7, wherein said discard indication signal is a HS-DSCH CAPACITY REQUEST control frame including a discard notification field providing identification of said one or more RLC PDUs.

10. The method of claim 7, wherein said discard indication signal is a Node B Application Part (NBAP) or Radio Network Subsystem Application Part (RNSAP) control message including a discard notification field providing identification of said one or more RLC PDUs.

11. The method of claim 7, wherein said discard indication signal includes sequence numbers of said one or more identified RLC PDUs.

12. The method of claim 7, wherein said one or more identified RLC PDUs includes a first RLC PDU and a second RLC PDU and wherein said discard indication signal includes a sequence number of the first RLC PDU and a difference value indicating a difference between a sequence number of said second RLC PDU and the sequence number of said first RLC PDU.

13. A radio base station, said radio base station configurable for participating in inter-site High-Speed Downlink Packet Access Multiflow Data Transmission (HSDPA MF) operation wherein data is communicated to a first user equipment via the radio base station and at least one other radio base station and wherein data is communicated from a radio network controller to the radio base station and the at least one other radio base station in Medium Access Control-dedicated (MAC-d) Protocol Data Units (PDUs) the radio base station comprising:
a receiver arranged to receive a MAC-d PDU; and
digital data processing circuitry, operable connected to the receiver and arranged to associate a timer with the MAC-d PDU and setting the timer to expire after a predetermined time period, the digital data processing circuitry further arranged to discard the received MAC-d PDU if no Hybrid Automatic Repeat request (HARQ) process has been assigned for transfer of the MAC-d PDU to the first user equipment upon expiry of the timer.

14. The radio base station of claim 13, wherein the timer associated with the MAC-d PDU is stopped upon assigning a HARQ process for transfer of the MAC-d PDU to the user equipment.

15. The radio base station of claim 13, wherein the predetermined time period is set according to a parameter received from the radio network controller.

16. The radio base station of claim 13, wherein the predetermined time period is selected by the radio base station.

17. The radio base station of claim 13, wherein the predetermined time period is selected based on one or more of cell load, downlink radio link quality, uplink radio link quality, QoS requirements or MAC-d PDU size.

18. The radio base station of claim 13, wherein all MAC-d PDUs received in one High-Speed Downlink Shared Channel (HS-DSCH) data frame are associated with a common timer.

19. A radio base station, said radio base station being configurable for participating in inter-site High-Speed Downlink Packet Access Multiflow Data Transmission (HS-DPA MF) operation wherein data is communicated to a first user equipment via the radio base station and at least one other radio base station and wherein data is communicated from a radio network controller to the radio base station and the at least one other radio base station for forwarding to the first user equipment in Radio Link Control (RLC) Protocol Data Units (PDUs) encapsulated in Medium Access Control-dedicated (MAC-d) PDUs, the radio base station comprising:

a receiver and digital data processing circuitry operable connected to the receiver, wherein the receiver is arranged to receive MAC-d PDUs and further to receive a discard indication signal from the radio network controller instructing the radio base station to discard one or more RLC PDUs, and wherein the digital data processing circuitry is arranged to buffer the received MAC-d PDUs in a queue pending transfer to the first user equipment and further arranged to, upon the receiver receiving the discard indication signal, search through the MAC-d PDUs currently in the queue pending transfer to the first user equipment and to discard any MAC-d PDUs found in the queue containing a RLC PDU comprised in said one or more RLC PDUs.

20. The radio base station of claim 19, wherein said discard indication signal is a High-Speed Downlink Shared Channel (HS-DSCH) DATA FRAME including a discard notification field providing identification of said one or more RLC PDUs.

21. The radio base station of claim 19, wherein said discard indication signal is a HS-DSCH CAPACITY REQUEST control frame including a discard notification field providing identification of said one or more RLC PDUs.

22. The radio base station of claim 19, wherein said discard indication signal is a Node B Application Part (NBAP) or Radio Network Subsystem Application Part (RNSAP) control message including a discard notification field providing identification of said one or more RLC PDUs.

23. The radio base station of claim 19, wherein said discard indication signal includes sequence numbers of said one or more identified RLC PDUs.

24. The radio base station of claim 19, wherein said one or more identified RLC PDUs includes a first RLC PDU and a second RLC PDU and wherein said discard indication signal includes a sequence number of the first RLC PDU and a difference value indicating a difference between a sequence number of said second RLC PDU and the sequence number of said first RLC PDU.

* * * * *